(12) United States Patent
Chen et al.

(10) Patent No.: US 8,305,499 B2
(45) Date of Patent: Nov. 6, 2012

(54) IMAGE PROCESSING CIRCUIT AND METHOD FOR IMAGE PROCESSING

(75) Inventors: Wei-Fu Chen, Taipei County (TW); Fu-Sheng Liang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 481 days.

(21) Appl. No.: 12/573,145

(22) Filed: Oct. 4, 2009

(65) Prior Publication Data

US 2010/0295996 A1 Nov. 25, 2010

(30) Foreign Application Priority Data

May 21, 2009 (TW) ................................ 98116863 A

(51) Int. Cl.
*H04N 5/213* (2006.01)
*H04N 5/21* (2006.01)
*H04N 5/217* (2011.01)

(52) U.S. Cl. ..................... 348/624; 348/623; 348/630

(58) Field of Classification Search ................ 348/253, 348/624, 630, 623, 645–647, 679, 708, 713; 382/167, 266, 274; 345/589, 611; 358/518
See application file for complete search history.

(56) References Cited

U.S. PATENT DOCUMENTS

| | | | | |
|---|---|---|---|---|
| 4,400,721 A | * | 8/1983 | Macovski | 348/628 |
| 5,012,331 A | * | 4/1991 | Schuster | 348/253 |
| 5,172,219 A | * | 12/1992 | Itou | 348/631 |
| 5,621,480 A | * | 4/1997 | Hanai | 348/679 |
| 6,438,264 B1 | | 8/2002 | Gallagher et al. | |
| 6,807,300 B1 | * | 10/2004 | Gindele et al. | 382/167 |
| 2005/0248687 A1 | | 11/2005 | Lee et al. | |
| 2006/0256217 A1 | * | 11/2006 | Hatano | 348/272 |
| 2007/0242875 A1 | * | 10/2007 | Tanaka et al. | 382/162 |
| 2008/0122980 A1 | | 5/2008 | Schoner | |

OTHER PUBLICATIONS

"First Office Action of China Counterpart Application", issued on Sep. 7, 2011, p. 1-p. 4.
"Office Action of Taiwan Counterpart Application", issued on Aug. 23, 2012, p1-p6, in which the listed references were cited.

* cited by examiner

*Primary Examiner* — Victor Kostak
(74) *Attorney, Agent, or Firm* — Jianq Chyun IP Office

(57) ABSTRACT

A circuit and a method for image processing are provided. The image processing circuit has an adaptor and a sharpening circuit. The adaptor has a processing unit and a weight generator. The processing unit receives an input video signal, and the input video signal has information of a plurality of pixels. The processing unit processes the input video signal to calculate a color difference value of a target pixel of the pixels. The weight generator generates a weighting signal according to the color difference value. The sharpening circuit performs a sharpening operation on the input video signal according to the weighting signal to generate a sharpened video signal.

40 Claims, 8 Drawing Sheets

IMAGE PROCESSING CIRCUIT AND METHOD FOR IMAGE PROCESSING

CROSS-REFERENCE TO RELATED APPLICATION

This application claims the priority benefit of Taiwan application serial no. 98116863, filed on May 21, 2009. The entirety of the above-mentioned patent application is hereby incorporated by reference herein and made a part of this specification.

BACKGROUND OF THE INVENTION

1. Field of Invention

The present invention relates to an image processing circuit and an image processing method. More particularly, the present invention relates to an image processing circuit and an image processing method that perform an image sharpening operation.

2. Description of Related Art

When a video is played, color and tone are not the only characteristics that draw observers' attention. Edges, which define the shapes of objects in the video, also attract observers' attention. Image processing is a kind of operation that enhances those video characteristics and improves or emphasizes visual effects of the video. For example, post procedure can make images captured by digital cameras or scanners become clearer and more colorful.

Sharpening operation is an important image processing technique. "Sharpness" is a term that people frequently use to indicate a contract ratio. After sharpening the edges of an object in an image, the image's contrast ratio increases, and the object becomes more conspicuous. After performing a sharpening operation on an original image to generate a sharpened image, observers generally deem that the sharpened image is clearer than the original image.

The sharpening operation can enhance the edges of the objects in the images. However, it can also result in some undesired visual effects. For example, in a border area between different colors, such as between white cloud and blue sky, sharpening operation may generate discernible halo and decrease the visual quality of the image.

SUMMARY OF THE INVENTION

Accordingly, the present invention provides an image processing circuit and an image processing method, thereby receiving an input video signal of a plurality of pixels, generating a weighting signal through calculating color difference values among the pixels, and performing a sharpening operation on the input video signal according to the weighting signal.

The present invention provides an image processing circuit that includes an adaptor and a sharpening circuit. The adaptor includes a processing unit and a weight generator. The processing unit receives an input video signal that includes information of a plurality of pixels. According to chromatic information of at least two pixels adjacent to a target pixel, the processing unit processes the input video signal to determine a color difference value of a target pixel of the pixels. The weight generator is coupled to the processing unit and generates a weighting signal according to the color difference value. The weighting signal includes a weighting value of the target pixel. The sharpening circuit is coupled to the adaptor and performs a sharpening operation on the input video signal according to the weighting signal to generate a sharpened video signal.

The present invention provides an image processing method that includes following steps: receiving an input video signal that includes information of a plurality of pixels, processing the input video signal to determine a color difference value of a target pixel of the pixels according to chromatic information of at least two pixels adjacent to the target pixel, generating a weighting signal which includes the weighting value of the target pixel according to the color difference value, and performing a sharpening operation on the input video signal according to the weighting signal to generate a sharpened video signal.

According to an embodiment of the present invention, the chromatic information of each of the at least two adjacent pixels includes a first chrominance Cb and a second chrominance Cr.

According to an embodiment of the present invention, the processing unit calculates the color difference value of the target pixel according to a first chrominance and a second chrominance of a first pixel and a first chrominance and a second chrominance of a second pixel. The first and the second pixels are adjacent to the target pixel.

According to an embodiment of the present invention, the color difference value equals $(|Cb(1)-Cb(2)|+|Cr(1)-Cr(2)|)/2$. $Cb(1)$ and $Cr(1)$ are a first chrominance and a second chrominance of the first pixel, respectively. $Cb(2)$ and $Cr(2)$ are a first chrominance and a second chrominance of the second pixel, respectively.

According to an embodiment of the present invention, the first chrominance Cb and the second chrominance Cr serve as two reference axes of a chromatic coordinate system. The chromatic coordinate system includes four regions $\{(Cb, Cr)|Cb \leq Cb2, Cr \leq Cr2\}$, $\{(Cb, Cr)| Cb \geq -Cb1, Cr \leq Cr2\}$, $\{(Cb, Cr)|Cb \leq Cb2, Cr \geq Cr1\}$, and $\{(Cb, Cr)|Cb \geq Cb1, Cr \geq Cr1\}$, where $Cb2>Cb1>0$, and $Cr2>Cr1>0$. The first and the second chrominances of the first pixel are $Cb(1)$ and $Cr(1)$, respectively. The first and the second chrominances of the second pixel are $Cb(2)$ and $Cr(2)$, respectively. The possessing unit determines the color difference value according to the region(s) where coordinates $(Cb(1),Cr(1))$ and $(Cb(2),Cr(2))$ are located.

According to an embodiment of the present invention, when the coordinates $(Cb(1),Cr(1))$ and $(Cb(2),Cr(2))$ are located in a same region of the four regions, the color difference value equals 0.

According to an embodiment of the present invention, when the coordinates $(Cb(1),Cr(1))$ and $(Cb(2),Cr(2))$ are located in two different regions of the four regions, the color difference value equals $\sqrt{(Cb(1)-Cb(2))^2+(Cr(1)-Cr(2))^2}$.

According to an embodiment of the present invention, when the coordinates $(Cb(1),Cr(1))$ and $(Cb(2),Cr(2))$ are located in two different regions of the four regions, the color difference value equals $(|Cb(1)-Cb(2)|+|Cr(1)-Cr(2)|)$.

According to an embodiment of the present invention, the target pixel is located at the middle point of the first and the second pixels.

According to an embodiment of the present invention, the weighting value is a monotonic decreasing function of the color difference value.

According to an embodiment of the present invention, the weight generator interpolates the weighting value of the target pixel according to at least two predetermined color difference values and corresponding weighting values.

According to an embodiment of the present invention, the weight generator looks up the weighting value of the target pixel from a lookup table according to the color difference value.

According to an embodiment of the present invention, the sharpening circuit includes a first multiplier. The first multiplier is coupled to adaptor and multiplies the weighting value of the target pixel by a gain. The sharpening circuit performs the sharpening operation on the input video signal according to the weighting signal and the gain to generate the sharpened video signal.

According to an embodiment of the present invention, the sharpening circuit includes a high-pass filter, a coring circuit, a second multiplier, a delay unit, and an adder. The high-pass filter receives the input video signal and high-pass filters the input video signal to generate a high frequency video signal. The coring circuit is coupled to the high-pass filter and eliminates a core portion of the high frequency video signal to generate a coring video signal. The second multiplier is coupled to the weight generator and the coring circuit and multiplies the coring video signal by the weighting signal to generate a sharpened signal. The delay unit receives and delays the input video signal to generate a delayed video signal. The adder is coupled to the second multiplier and the delay unit and adds up the sharpened signal and the delayed video signal to generate the sharpened video signal.

According to an embodiment of the present invention, the sharpening circuit includes a low-pass filter, a coring circuit, a second multiplier, a delay unit, and a subtractor. The low-pass filter receives and low-pass filters the input video signal to generate a low frequency video signal. The coring circuit is coupled to the low-pass filter and eliminates a core portion of the low frequency video signal to generate a coring video signal. The second multiplier is coupled to the weight generator and the coring circuit and multiplies the coring video signal by the weighting signal to generate a sharpened signal. The delay unit receives and delays the input video signal to generate a delayed video signal. The subtractor is coupled to the second multiplier and the delay unit and subtracts the sharpened signal from the delayed video signal to generate the sharpened video signal.

According to an embodiment of the present invention, the processing unit receives the input video signal and determines the color difference values of the pixels in the input video signal. The weight generator generates the weighting signal according to the color difference values of the pixels. The weighting signal includes the weighting values of the pixels. The weighting value of each of the pixels is determined according to the color difference value of the pixel. Generally, pixels on the border area of different colors have relatively larger color difference values. Therefore, the weight generator adaptively adjusts the weighting value according to the color difference value of each of the pixels. Since the sharpening circuit adjusts the degree of the performed sharpening operation according to the weighting signal, the sharpened video signal has a better visual quality.

In order to the make the aforementioned and other features and advantages of the present invention comprehensible, embodiments accompanied with figures are described in detail below.

It is to be understood that both the foregoing general description and the following detailed description are merely exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
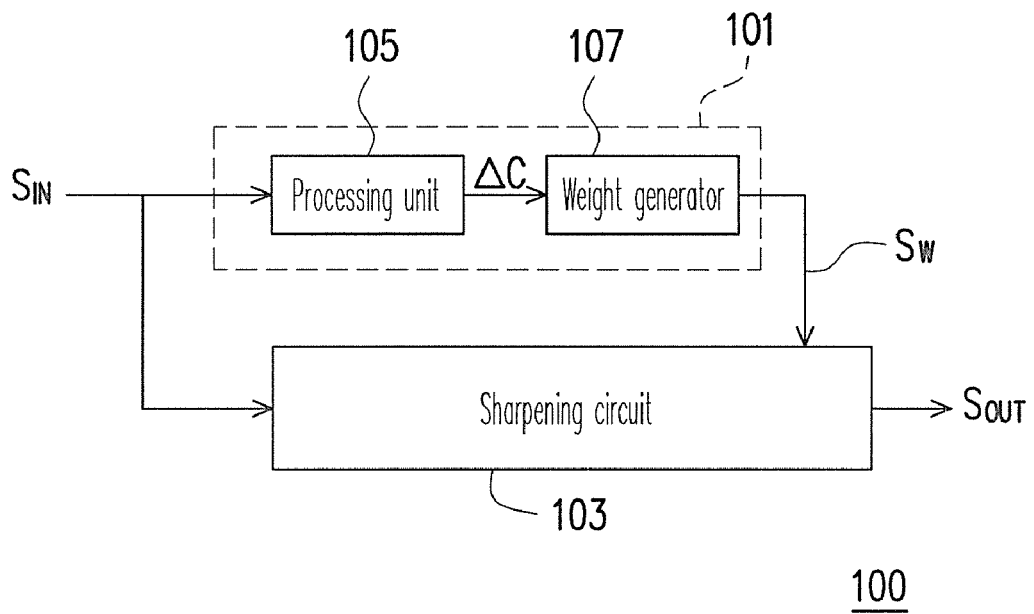
FIG. 1 is a block diagram of an image processing circuit according to an embodiment of the present invention.

Please refer to FIG. 1, which is a block diagram of an image processing circuit according to an embodiment of the present invention. The image processing circuit 100 receives an input video signal $S_{IN}$ and performs a sharpening operation on the input video signal $S_{IN}$ to generate a sharpened video signal $S_{OUT}$. The image processing circuit 100 includes an adaptor 101 and a sharpening circuit 103. The adaptor 101 includes a processing unit 105 and a weight generator 107. The processing unit 105 receives the input video signal $S_{IN}$ which includes information of a plurality of pixels. Please refer to FIG. 2, which is a schematic diagram showing some pixels of the input video signal according to an embodiment of the present invention. Pixels $P_{N-3} \sim P_{N+3}$ are a series of pixels in the input video signal $S_{IN}$, where N is a positive integer, and $P_N$ is the target pixel.

Figure 2:
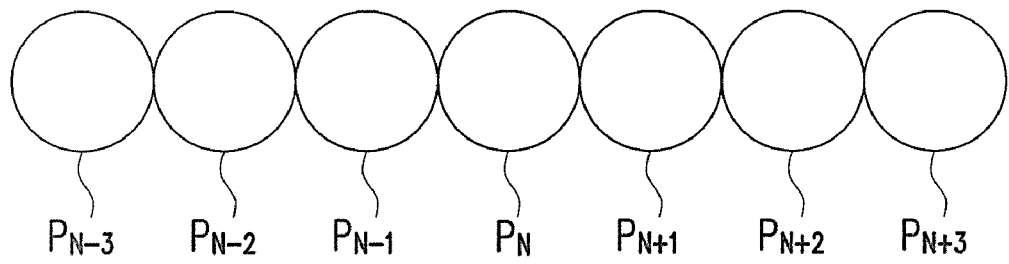
FIG. 2 is a schematic diagram showing some pixels of an input video signal according to an embodiment of the present invention.

Please refer to both FIG. 1 and FIG. 2. The processing unit 105 processes the input video signal $S_{IN}$ to determine color difference values $\Delta C$ of the pixels. In the input video signal $S_{IN}$, the chromatic information of each pixel includes a first chrominance Cb and a second chrominance Cr. In other words, Cb(N−3)~Cb(N+3) represent the first chrominances of the pixels $P_{N-3} \sim P_{N+3}$, respectively; Cr(N−3)~Cr(N+3) represent the second chrominances of the pixels $P_{N-3} \sim P_{N+3}$, respectively.

The color difference value $\Delta C$ of each pixel can be determined according to the chromatic information of at least two pixels adjacent to the pixel. For simplicity of explanation, in this embodiment the color difference value $\Delta C$ of each pixel is determined according to the chromatic information of two adjacent pixels. For example, to determine a color difference value $\Delta C_N$ of the target pixel $P_N$, the processing unit 105 can choose a first pixel $P_{N-3}$ and a second pixel $P_{N+3}$, which have the same distances from the target pixel $P_N$. In another embodiment, the processing unit 105 can choose pixels $P_{N-2}$ and $P_{N+2}$ as the first pixel and the second pixel, respectively. In yet another embodiment, the processing unit 105 can choose pixels $P_{N-1}$ and $P_{N+1}$ as the first pixel and the second pixel, respectively. The processing unit 105 then calculates the color difference value $\Delta C_N$ of the target pixel $P_N$ according to the chromatic information of the chosen first and second pixels. Please note that the processing unit 105 can also calculate the color difference value $\Delta C_N$ of the target pixel $P_N$ according to the chromatic information of more than two, e.g. four, pixels adjacent to the target pixel $P_N$.

As mentioned above, the processing unit 105 can calculate the color difference value $\Delta C_N$ of the target pixel $P_N$ according to the first and the second chrominances of the first pixel $P_{N-3}$ and the first and the second chrominances of the second pixel $P_{N+3}$. The following embodiment provides a way to calculate the color difference value $\Delta C_N$. First, a first color difference value |Cb(N−3)−Cb(N+3)| and a second color difference value |Cr(N−3)−Cr(N+3)| are calculated. Next, the average value of the two color difference values is calculated to obtain the color difference value $\Delta C_N$=(|Cb(N−3)−Cb(N+3)|+|Cr(N−3)−Cr(N+3)|)/2.

Figure 3:
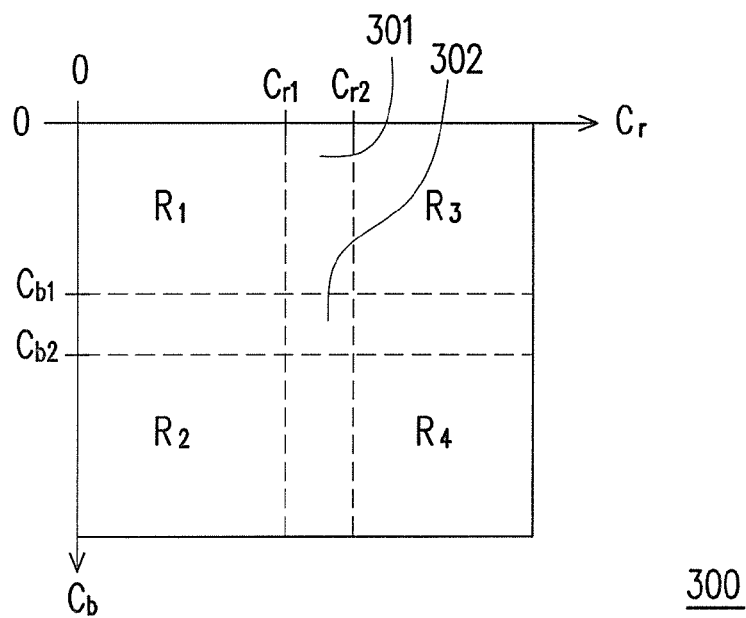
FIG. 3 is a diagram showing a chromatic coordinate system according to an embodiment of the present invention.

The following embodiment provides another way to calculate the color difference value $\Delta C_N$. Please refer to FIG. 3, which shows a chromatic coordinate system according to an embodiment of the present invention. The first chrominance Cb and the second chrominance Cr serve as the reference axes of the chromatic coordinate system 300. The chromatic coordinate system 300 has four regions including region R1, region R2, region R3, and region R4. In this embodiment, the regions R1~R4 are defined as: {(Cb, Cr)|Cb≦Cb2, Cr≦Cr2}, {(Cb, Cr)|Cb≧Cb1, Cr≦Cr2}, {(Cb, Cr)|Cb≦Cb2, Cr≧Cr1}, and {(Cb, Cr)|Cb≧Cb1, Cr≧Cr1}, respectively. Thresholds Cb1, Cb2, Cr1, and Cr2 are used to define the regions R1~R4, where Cb2>Cb1>0, and Cr2>Cr1>0. Please note that in this embodiment, each two regions of the four regions have an overlap area. For example, regions 301 and 302 constitute the overlap area of the regions R1 and R3.

In this embodiment, the color of the region R1 is close to green, the color of the region R2 is close to blue, the color of the region R3 is close to red, and the color of the region R4 is close to pink. Please note that the overlap area of every two regions has a color close to that of the two regions. For example, since the regions 301 and 302 constitute the overlap area of the regions R1 and R3, the color of the overlap area is close to both green and red. In addition, the difference between the thresholds Cb1 and Cb2 and the difference between the thresholds Cr1 and Cr2 correlate to the brightness of the chromatic coordinate system 300. The higher the brightness, the smaller the differences; the lower the brightness, the larger the differences.

In the chromatic coordinate system 300, the coordinate of the first pixel $P_{N-3}$ is (Cb(N−3),Cr(N−3)), and the coordinate of the second pixel $P_{N+3}$ is (Cb(N+3),Cr(N+3)). The color difference value $\Delta C_N$ of the target pixel $P_N$ is determined according to the region(s) where the coordinate (Cb(N−3),Cr(N−3)) of the first pixel $P_{N-3}$ and the coordinate (Cb(N+3),Cr(N+3)) of the second pixel $P_{N+3}$ are located. In this embodiment, when the coordinate (Cb(N−3),Cr(N−3)) of the first pixel $P_{N-3}$ and the coordinate (Cb(N+3),Cr(N+3)) of the second pixel $P_{N+3}$ are located in the same region, e.g. the region R1, the color difference value $\Delta C_N$ of the target pixel $P_N$ equals 0. When the coordinates (Cb(N−3),Cr(N−3)) and (Cb(N+3),Cr(N+3)) are located in two different regions, e.g. the coordinate (Cb(N−3),Cr(N−3)) is located in the region R1 while the coordinate (Cb(N+3),Cr(N+3)) is located in the region R2 and neither of the two coordinates is located in the overlap areas 301 and 302 of the regions R1 and R2, the color difference value $\Delta C_N$ equals the distance between the two coordinates. In other words, the color difference value $\Delta C_N$ equals $\sqrt{(Cb(N-3)-Cb(N+3))^2+(Cr(N-3)-Cr(N+3))^2}$. For simplicity, when the coordinates (Cb(N−3),Cr(N−3)) and (Cb(N+3),Cr(N+3)) are located in two different regions, the color difference value $\Delta C_N$ can also be equal to (|Cb(N−3)−Cb(N+3)|+|Cr(N−3)−Cr(N+3)|).

Please refer to FIG. 1. The processing unit 105 first calculates the color difference values ΔC of each of the pixels. Then, the weight generator 107 coupled to the processing unit 105 receives the color difference values ΔC and generates corresponding weighting values. In this embodiment, the weighting value is a monotonic decreasing function of the color difference value ΔC. In other words, the larger the color difference value $\Delta C_N$, the smaller the weighting value of the target pixel $P_N$. In this embodiment, the weight generator 107 interpolates the weighting values based on two predetermined color difference values and two corresponding weighting values.

Figure 4:
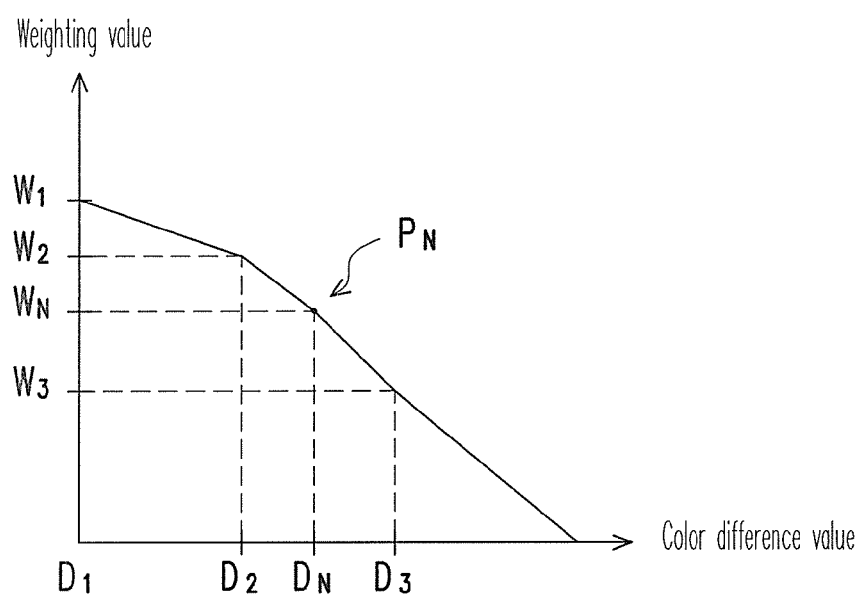
FIG. 4 is a coordinate diagram showing the relationship between a color difference value and a weighting value according to an embodiment of the present invention.

Please refer to FIG. 4, which shows the relationship between the color difference value and the weighting value according to an embodiment of the present invention. In this embodiment, the weight generator 107 uses three predetermined color difference values D1~D3 and three corresponding weighting values W1~W3 as bases for interpolating a weighting value $W_N$ corresponding to a color difference value $D_N$, where $D_3 > D_2 > D_1 \geq 0$, and $W_1 > W_2 > W_3 \geq 0$. For example, when the color difference value $D_N$ lies between the color difference values $D_2$ and $D_3$, the weight generator 107 can determine the weighting value $W_N$ according to the following equations:

$$\frac{D_N - D_2}{W_N - W_2} = \frac{D_3 - D_2}{W_3 - W_2}$$

$$W_N = W_2 + (W_3 - W_2) \times \frac{D_N - D_2}{D_3 - D_2}$$

Similarly, when the color difference value $D_N$ lies between the color difference values $D_1$ and $D_2$, the weight generator 107 can determine the weighting value $W_N$ according to the following equation:

$$\frac{D_N - D_1}{W_N - W_1} = \frac{D_2 - D_1}{W_2 - W_1}$$

In another embodiment, the weight generator 107 can utilize a lookup table to determine the weighting value of a target pixel according to the color difference value of the target pixel. The lookup table can be built according to the relationship between the two values as shown in FIG. 4. With the weighting values corresponding to various color difference values recorded in the lookup table, the weight generator 107 can lookup a weighting value of a pixel according to the color difference value of the pixel. The weight generator 107 then generates a weighting signal SW that includes the weighting values of the pixels.

Figure 5:
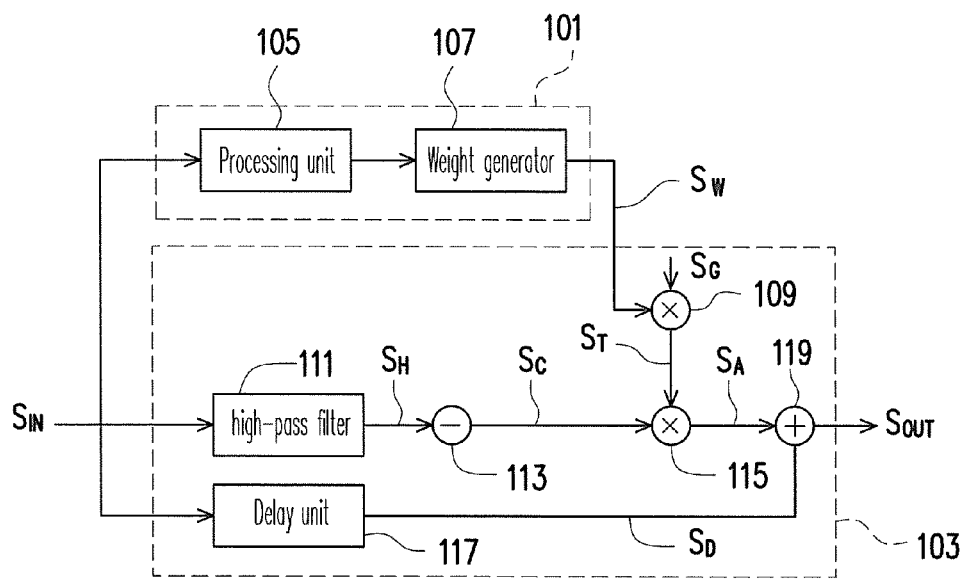
FIG. 5 is a block diagram of the sharpening circuit of FIG. 1.

Please refer back to FIG. 1. The sharpening circuit 103 is coupled to the adaptor 101 to receive the weighting signal $S_W$. The sharpening circuit 103 performs a sharpening operation on the input video signal $S_{IN}$ according to the weighting signal $S_W$ to generate the sharpened video signal $S_{OUT}$. Please refer to FIG. 5, which is a block diagram of the sharpening circuit 103 and the adaptor 101 according to another embodiment of the present invention. The sharpening circuit 103 includes a first multiplier 109, a high-pass filter 111, a coring circuit 113, a second multiplier 115, a delay unit 117, and an adder 119. The first multiplier 109 is coupled to the adaptor 101 to receive the weighting signal $S_W$. The first multiplier 109 multiplies each weighting value in the weighting signal $S_W$ by a gain $S_G$ to generate a total weighting signal $S_T$.

Figure 6:
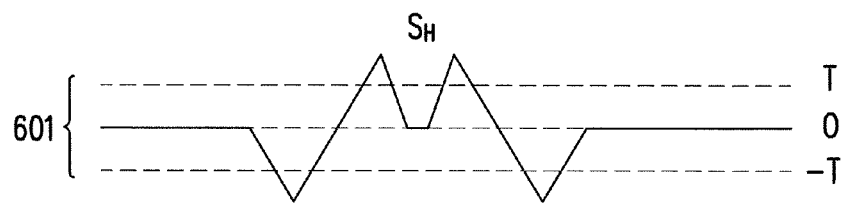
FIG. 6 is a partial timing diagram of a high frequency video signal according to an embodiment of the present invention.
Figure 7:
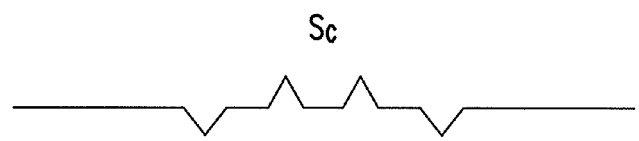
FIG. 7 is a partial timing diagram of a coring video signal according to an embodiment of the present invention.

The high-pass filter 111 receives the input video signal $S_{IN}$ and high-pass filters the input video signal $S_{IN}$ to generate a high frequency video signal $S_H$. The coring circuit 113 is coupled to the high-pass filter 111 to receive the high frequency video signal $S_H$. The coring circuit 113 eliminates a core portion of the high frequency video signal $S_H$ to generate a coring video signal $S_C$. Please refer to FIG. 6, which shows a partial timing diagram of the high frequency video signal according to an embodiment of the present invention. In this embodiment, the coring circuit 113 defines the core portion of the high frequency video signal $S_H$ to be between thresholds T and −T. A person of ordinarily skills in the art can modify the definition of the core portion by altering the value of the threshold T. FIG. 7 is a partial timing diagram of the coring video signal according to an embodiment of the present invention. As shown in FIG. 7, the high frequency video signal $S_H$ is changed into the coring video signal $S_C$ after the coring circuit 113 eliminates the core portion of the high frequency video signal $S_H$.

The second multiplier 115 is coupled to the first multiplier 109 and the coring circuit 113. The second multiplier 115 multiplies the coring video signal $S_C$ by the total weighting signal $S_T$ to generate a sharpened signal $S_A$. The delay unit 117 receives the input video signal $S_{IN}$ and delays the input video signal $S_{IN}$ to generate a delayed video signal $S_D$. The adder 119 is coupled to the second multiplier 115 and the delay unit 117. The adder 119 adds up the sharpened signal $S_A$ and the delayed video signal $S_D$ to generate a sharpened video signal $S_{OUT}$.

A person of ordinarily skills in the art is able to recognize that the sharpened signal $S_A$ can enhance the contrast, e.g. difference in brightness, between the target pixel $P_N$ and its adjacent pixel(s), which is not construed as a limitation to this application. In this embodiment, by multiplying the coring video signal $S_C$ by the total weighting signal $S_T$, the second multiplier 115 enhances the difference between the target pixel $P_N$ and its adjacent pixel(s) in not only brightness but also darkness. In another embodiment, the second multiplier 115 can multiply only the positive amplitudes of the coring video signal $S_C$ by the weighting signal $S_T$ to decrease the difference between the target pixel $P_N$ and its adjacent pixel(s) in only brightness. In yet another embodiment, the second multiplier 115 can multiply only the negative amplitudes of the coring video signal $S_C$ by the weighting signal $S_T$ to decrease the difference between the target pixel $P_N$ and its adjacent pixel(s) in only darkness.

Figure 8:
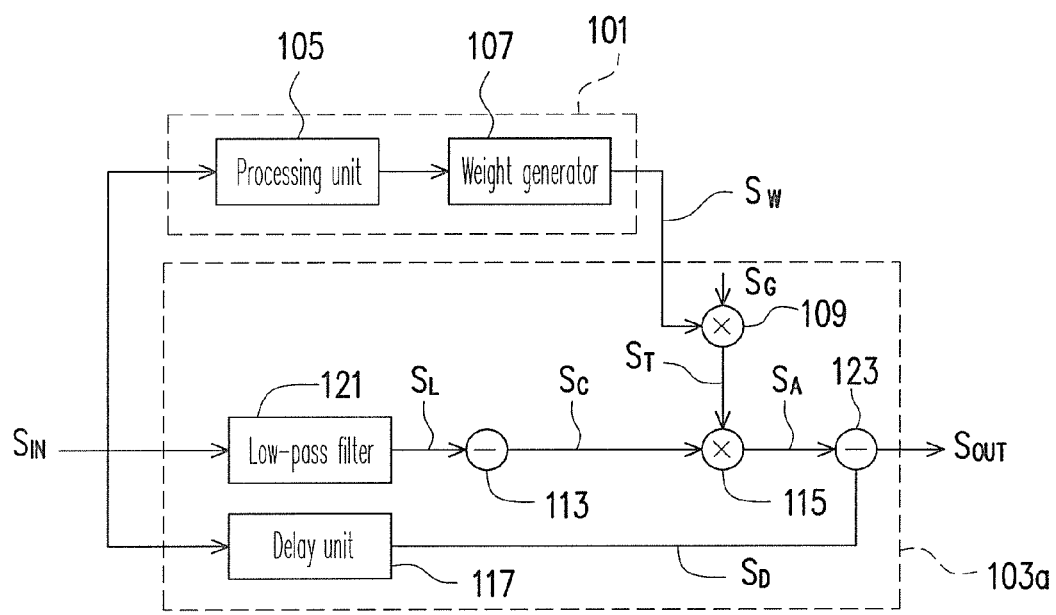
FIG. 8 is a block diagram of the sharpening circuit of FIG. 1.

Please refer to FIG. 8, which shows another embodiment of the sharpening circuit 103 of FIG. 1. As shown in FIG. 8, the sharpening circuit 103a includes a first multiplier 109, a low-pass filter 121, a coring circuit 113, a second multiplier 115, a delay unit 117, and a subtractor 123. Since the sharpening circuit 103a in FIG. 8 is similar to the sharpening circuit 103 in FIG. 5, the following description will focus on the difference between them. Please refer to FIG. 8, the low-pass filter 121 receives the input video signal $S_{IN}$ and low-pass filters the input video signal $S_{IN}$ to generate a low frequency video signal $S_L$. The coring circuit 113 is coupled to the low-pass filter 121 to receive the low frequency video signal $S_L$. The coring circuit 113 eliminates a core portion of the low frequency video signal $S_L$ to generate a coring video signal $S_C$. The subtractor 123 is coupled to the second multiplier 115 and the delay unit 117. The subtractor 123 subtracts the sharpened signal $S_A$ from the delayed video signal $S_D$ to generate a sharpened video signal $S_{OUT}$.

Figure 9:
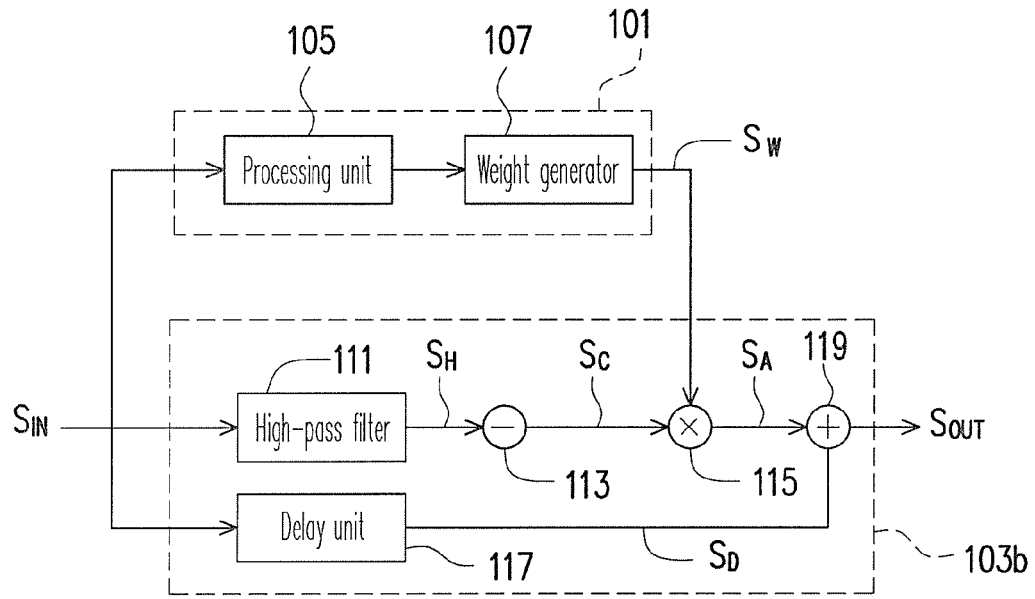
FIG. 9 is a block diagram of the sharpening circuit of FIG. 1.

Please refer to FIG. 9, which shows another embodiment of the sharpening circuit 103 of FIG. 1. As shown in FIG. 9, the sharpening circuit 103b includes a high-pass filter 111, a coring circuit 113, a second multiplier 115, a delay unit 117, and an adder 119. Since the sharpening circuit 103b in FIG. 9 is similar to the sharpening circuit 103 in FIG. 5, the following description will focus on the difference between them. Unlike the sharpening circuit 103, the sharpening circuit 103b does not include a first multiplier 109. The second multiplier 115 is coupled to the weight generator 107 and the coring circuit 113 directly. The second multiplier 115 multiplies the coring video signal $S_C$ by the weighting signal $S_W$ to generate the sharpened signal $S_A$.

Figure 10:
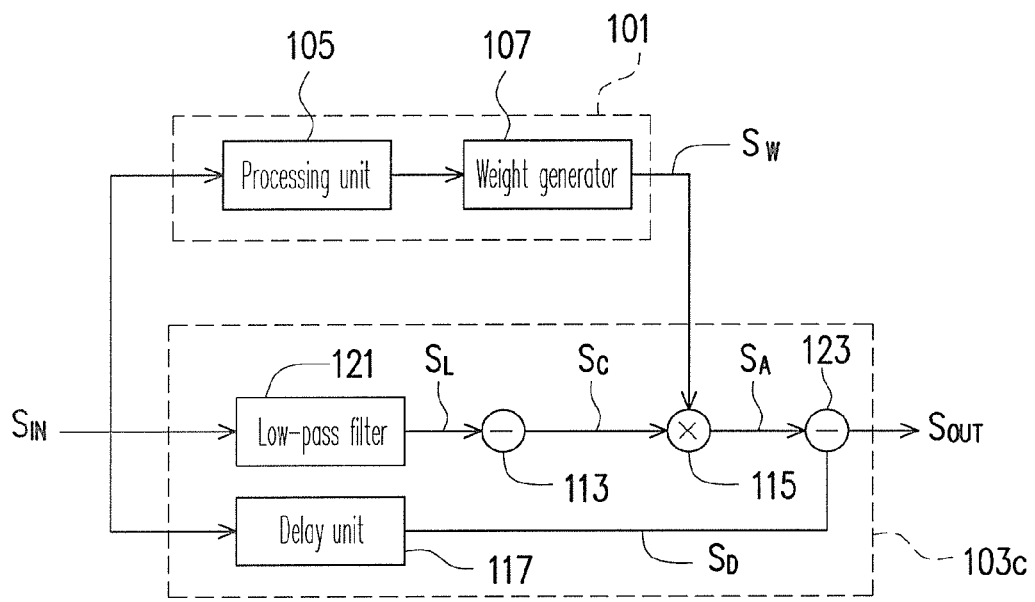
FIG. 10 is a block diagram of the sharpening circuit of FIG. 1.

Please refer to FIG. 10, which shows yet another embodiment of the sharpening circuit 103 of FIG. 1. The sharpening circuit 103c includes a low-pass filter 121, a coring circuit 113, a second multiplier 115, a delay unit 117, and a subtractor 123. Since the sharpening circuit 103c in FIG. 10 is similar to the sharpening circuit 103a in FIG. 8, the following description will focus on the difference between them. Unlike the sharpening circuit 103a, the sharpening circuit 103c does not include a first multiplier 109. The second multiplier 115 is coupled to the weight generator 107 and the coring circuit 113 directly. The second multiplier 115 multiplies the coring video signal $S_C$ by the weighting signal $S_W$ to generate the sharpened signal $S_A$.

Figure 11:
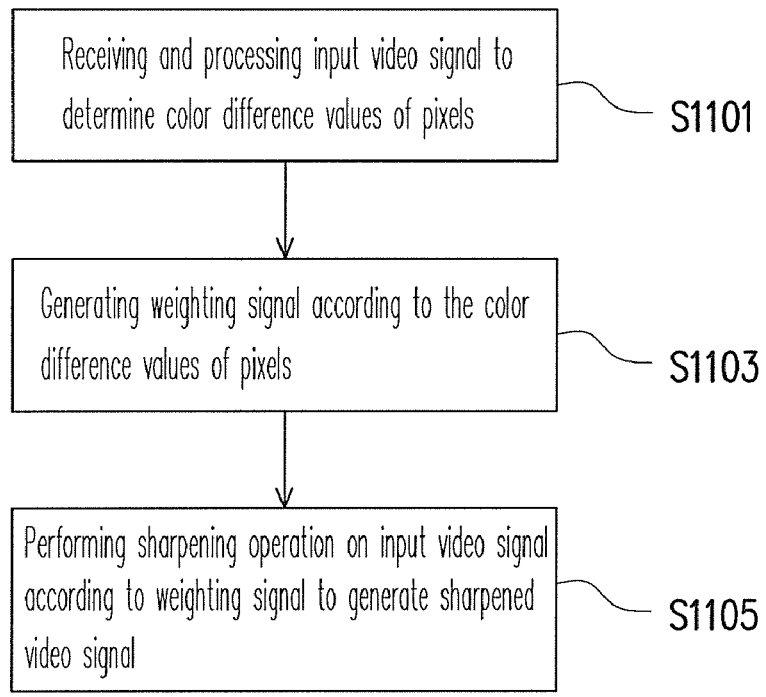
FIG. 11 is a flow chart of an image processing method according to an embodiment of the present invention.

In addition to the aforementioned embodiments, an image processing method is described in the following paragraphs. Please refer to FIG. 11, which is a flow chart of the image processing method according to an embodiment of the present invention. The image processing method in this embodiment includes steps S1101, S1103, and S1105. In step S1101, an input video signal that includes the information of a plurality of pixels is received, and the input video signal is processed to determine the color difference values of the pixels. The color difference value of each target pixel is determined according to the chromatic information of at least two pixels adjacent to the target pixel.

In this embodiment, the chromatic information of each pixel includes a first chrominance Cb and a second chrominance Cr. The color difference value of a target pixel is determined according to the first and the second chrominances of a first pixel and the first and the second chrominances of a second pixel. The first and the second pixels are adjacent to the target pixel, and the target pixel is located on the middle point of the first and the second pixels. Hereinafter, Cb(1) and Cr(1) are used to represent the first and the second chrominances of the first pixel, respectively; Cb(2) and Cr(2) are used to represent the first and the second chrominances of the second pixel, respectively. The color difference value of the target pixel equals $(|Cb(1)-Cb(2)|+|Cr(1)-Cr(2)|)/2$.

According to an embodiment of the present invention, the color difference value of the target pixel is calculated as follows. In a chromatic coordinate system, the first chrominance Cb and the second chrominance Cr are used as reference axes, and there are four regions: $\{(Cb, Cr)| Cb \leq Cb2, Cr \leq Cr2\}$, $\{(Cb, Cr)| Cb \geq Cb1, Cr \leq Cr2\}$, $\{(Cb, Cr)| Cb \leq Cb2, Cr \geq Cr1\}$, and $\{(Cb, Cr)| Cb \geq Cb1, Cr \geq Cr1\}$, where $Cb2 > Cb1 > 0$ and $Cr2 > Cr1 > 0$. In the embodiment, the color difference value is determined according to region(s) of the chromatic coordinate system where the coordinates (Cb(1),Cr(1)) and (Cb(2),Cr(2)) are located. For example, when the coordinates (Cb(1),Cr(1)) and (Cb(2),Cr(2)) lie in the same region of the four regions, the color difference value equals 0. When the coordinates (Cb(1),Cr(1)) and (Cb(2),Cr(2)) lie in two different regions of the four regions, the color difference value equals $\sqrt{(Cb(1)-Cb(2))^2+(Cr(1)-Cr(2))^2}$. In another embodiment, when the coordinates (Cb(1),Cr(1)) and (Cb(2),Cr(2)) lie in two different regions of the four regions, the color difference value equals (|Cb(1)−Cb(2)|+|Cr(1)−Cr(2)|).

In step S1103, the weighting signal is generated according to the color difference values of the pixels. The weighting signal includes the weighting values of the pixels, and the weighting value of each pixel is generated according to the color difference value of the pixel. In this embodiment, the weighting value is a monotonic decreasing function of the color difference value. There are several sub-steps of step S1103 which can be adopted to calculate the weighting values. For example, with at least two predetermined color difference values and corresponding weighting values, the weighting values of the pixels can be interpolated in step S1103 according to the predetermined values. A lookup table can also be utilized in step S1103 to lookup the weighting values for the pixels.

Figure 12:
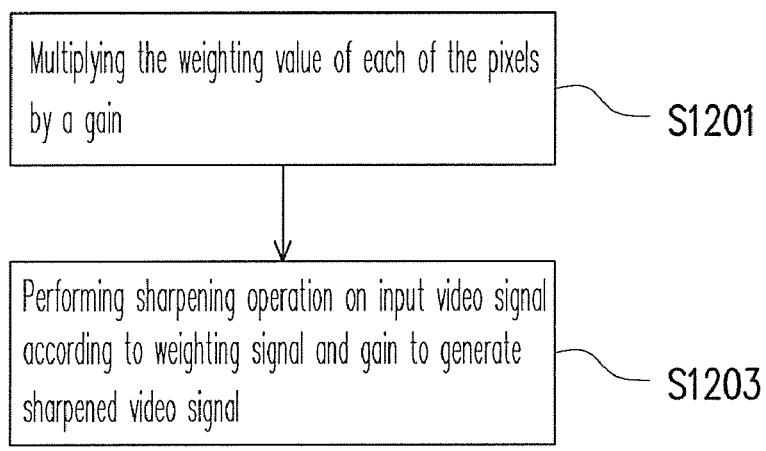
FIGS. 12~14 are flow charts of generating a sharpened video signal according to an embodiment of the present invention.

In step S1105, a sharpening operation is performed on the input video signal according to the weighting signal to generate the sharpened video signal. Please refer to FIG. 12, which is a flow chart showing how the sharpened video signal is generated according to an embodiment of the present invention. In step S1201, the weighting value of each of the pixels is multiplied by a gain. In step S1203, a sharpening operation is performed on the input video signal according to the weighting signal and the gain to generate the sharpened video signal.

Figure 13:
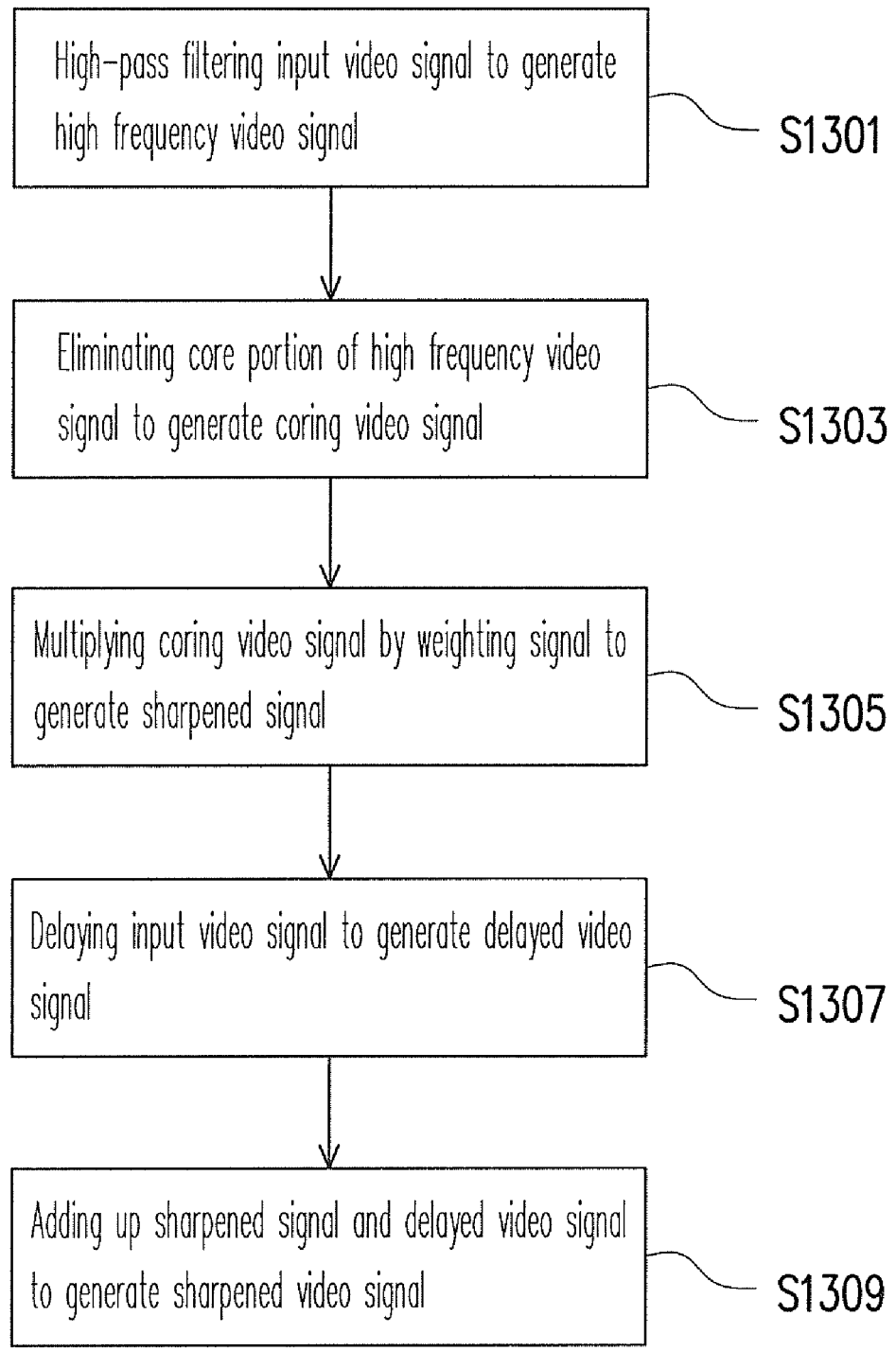

Please refer to FIG. 13, which shows another way to generate the sharpened video signal. In step S1301, the input video signal is high-pass filtered to generate a high frequency video signal. In step S1303, the core portion of the high frequency video signal is eliminated to generate a coring video signal. In step S1305, the coring video signal is multiplied by the weighting signal to generate a sharpened signal. In step S1307, the input video signal is delayed to generate a delayed video signal. In step S1309, the sharpened signal and the delayed video signal are added up to generate the sharpened video signal.

Figure 14:
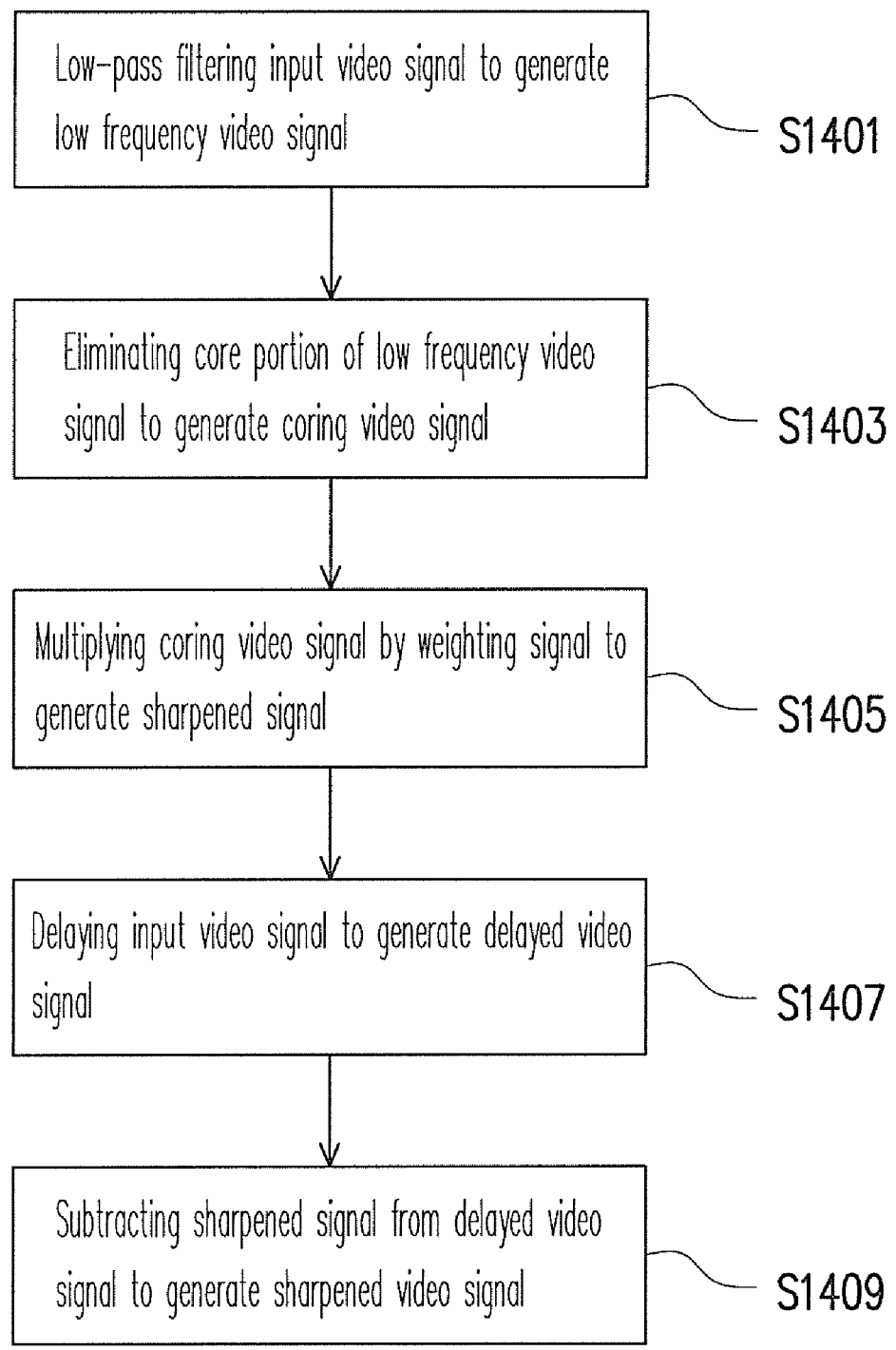

Please refer to FIG. 14, which shows yet another way to generate the sharpened video signal. In step S1401, the input video signal is low-pass filtered to generate a low frequency video signal. In step S1403, the core portion of the low frequency video signal is eliminated to generate a coring video signal. In step S1405, the coring video signal is multiplied by the weighting signal to generate a sharpened signal. In step S1407, the input video signal is delayed to generate a delayed video signal. In step S1409, the sharpened signal is subtracted from the delayed video signal to generate the sharpened video signal.

As mentioned above, the processing unit 105 receives the input video signal $S_{IN}$ and then determines the color difference values ΔC of the pixels in the input video signal $S_{IN}$. In one embodiment, the processing unit 105 determines the color difference value ΔC of a target pixel according to the chromatic information of at least two pixels adjacent to the target pixel. The chromatic information of each pixel includes a first chrominance Cb and a second chrominance Cr. Generally, the pixels lying in the border area of different colors have larger color difference values. According to the color difference values ΔC generated by the processing unit 105, the weight generator 107 generates a weighting signal $S_W$. For example, according to the color difference value ΔC of each pixel, the weight generator 107 performs an interpolation or a table-lookup operation to determine the weighting value of the pixel. To shun undesired effects, such as halos, on color borders, a larger color difference value ΔC should correspond to a smaller weighting value. The weighting signal $S_W$ includes the weighting values of the pixels. The sharpening circuit 103 adjusts the degree of the sharpening operation performed on the input video signal $S_{IN}$ according to the weighting signal $S_W$. The resulted sharpened video signal $S_{OUT}$ then has a better visual quality than that of the input video signal $S_{IN}$.

It will be apparent to those skilled in the art that various modifications and variations can be made to the structure of the present invention without departing from the scope or the spirit of the invention. In view of the foregoing, it is intended that the present invention covers modifications and variations of this invention provided they fall within the scope of the following claims and their equivalents.

What is claimed is:

1. An image processing circuit, comprising:
   an adaptor, comprising:
      a processing unit, for receiving an input video signal comprising information of a plurality of pixels, and for processing the input video signal to determine a color difference value corresponding to a target pixel according to chromatic information of at least two pixels adjacent to the target pixel; and
      a weight generator, coupled to the processing unit, for generating a weighting signal according to the color difference value, wherein the weighting signal comprises a weighting value of the target pixel; and
   a sharpening circuit, coupled to the adaptor, for performing a sharpening operation on the input video signal according to the weighting signal to generate a sharpened video signal, wherein the sharpening circuit comprises:
      a first multiplier, coupled to the adaptor, for multiplying the weighting value of the target pixel by a gain such that the sharpening circuit performs the sharpening operation on the input video signal according to the weighting signal and the gain to generate the sharpened video signal.

2. The image processing circuit of claim 1, wherein the chromatic information of each of the at least two adjacent pixels comprises a first chrominance Cb and a second chrominance Cr.

3. The image processing circuit of claim 2, wherein the processing unit calculates the color difference value of the target pixel according to a first chrominance and a second chrominance of a first pixel and a first chrominance and a second chrominance of a second pixel, the first and the second pixels being adjacent to the target pixel.

4. The image processing circuit of claim 3, wherein the color difference value equals (|Cb(1)−Cb(2)|+|Cr(1)−Cr(2)|)/2, Cb(1) and Cr(1) are the first chrominance and the second chrominance of the first pixel respectively, and Cb(2) and Cr(2) are the first chrominance and the second chrominance of the second pixel respectively.

5. The image processing circuit of claim 3, wherein the first chrominance Cb and the second chrominance Cr serve as two reference axes of a chromatic coordinate system, the chromatic coordinate system comprises four regions {(Cb, Cr)|Cb≦$Cb_2$, Cr≦$Cr_2$}, {(Cb,Cr)|Cb≧$Cb_1$, Cr≦$Cr_2$}, {(Cb, Cr)|Cb≦$Cb_2$, Cr≧$Cr_1$}, and {(Cb, Cr)|Cb≧$Cb_1$, Cr≧$Cr_1$}, where $Cb_2$>$Cb_1$>0, $Cr_2$>$Cr_1$>0, the first and the second chrominances of the first pixel are Cb(1) and Cr(1), the first and the second chrominances of the second pixel are Cb(2)

and Cr(2), and the possessing unit determines the color difference value according to region(s) of the chromatic coordinate system where coordinates (Cb(1),Cr(1)) and (Cb(2),Cr(2)) are located.

6. The image processing circuit of claim 5, wherein when the coordinates (Cb(1),Cr(1)) and (Cb(2),Cr(2)) lie in a same region of the four regions, the color difference value equals 0.

7. The image processing circuit of claim 5, wherein when the coordinates (Cb(1),Cr(1)) and (Cb(2),Cr(2)) lie in two different regions of the four regions, the color difference value equals $\sqrt{(Cb(1)-Cb(2))^2+(Cr(1)-Cr(2))^2}$.

8. The image processing circuit of claim 5, wherein when the coordinates (Cb(1),Cr(1)) and (Cb(2),Cr(2)) lie in two different regions of the four regions, the color difference value equals (|Cb(1)−Cb(2)|+|Cr(1)−Cr(2)|).

9. The image processing circuit of claim 3, wherein the target pixel is located at the middle point of the first and the second pixels.

10. The image processing circuit of claim 1, wherein the weighting value is a monotonic decreasing function of the color difference value.

11. The image processing circuit of claim 10, wherein the weight generator interpolates the weighting value of the target pixel according to at least two predetermined color difference values and corresponding weighting values.

12. The image processing circuit of claim 1, wherein the weight generator looks up the weighting value of the target pixel from a lookup table according to the color difference value.

13. An image processing circuit, comprising:
an adaptor, comprising:
a processing unit, for receiving an input video signal comprising information of a plurality of pixels, and for processing the input video signal to determine a color difference value corresponding to a target pixel according to chromatic information of at least two pixels adjacent to the target pixel; and
a weight generator, coupled to the processing unit, for generating a weighting signal according to the color difference value, wherein the weighting signal comprises a weighting value of the target pixel; and
a sharpening circuit, coupled to the adaptor, for performing a sharpening operation on the input video signal according to the weighting signal to generate a sharpened video signal, wherein the sharpening circuit comprises:
a high-pass filter, for receiving the input video signal and high-pass filtering the input video signal to generate a high frequency video signal;
a coring circuit, coupled to the high-pass filter, for eliminating a core portion of the high frequency video signal to generate a coring video signal;
a second multiplier, coupled to the weight generator and the coring circuit, for multiplying the coring video signal by the weighting signal to generate a sharpened signal;
a delay unit, for receiving and delaying the input video signal to generate a delayed video signal; and
an adder, coupled to the second multiplier and the delay unit, for adding up the sharpened signal and the delayed video signal to generate the sharpened video signal.

14. The image processing circuit of claim 13, wherein the chromatic information of each of the at least two adjacent pixels comprises a first chrominance Cb and a second chrominance Cr.

15. The image processing circuit of claim 14, wherein the processing unit calculates the color difference value of the target pixel according to a first chrominance and a second chrominance of a first pixel and a first chrominance and a second chrominance of a second pixel, the first and the second pixels being adjacent to the target pixel.

16. The image processing circuit of claim 13, wherein the weighting value is a monotonic decreasing function of the color difference value.

17. An image processing circuit, comprising:
an adaptor, comprising:
a processing unit, for receiving an input video signal comprising information of a plurality of pixels, and for processing the input video signal to determine a color difference value corresponding to a target pixel according to chromatic information of at least two pixels adjacent to the target pixel; and
a weight generator, coupled to the processing unit, for generating a weighting signal according to the color difference value, wherein the weighting signal comprises a weighting value of the target pixel; and
a sharpening circuit, coupled to the adaptor, for performing a sharpening operation on the input video signal according to the weighting signal to generate a sharpened video signal, wherein the sharpening circuit comprises:
a low-pass filter, for receiving and low-pass filtering the input video signal to generate a low frequency video signal;
a coring circuit, coupled to the low-pass filter, for eliminating a core portion of the low frequency video signal to generate a coring video signal;
a second multiplier, coupled to the weight generator and the coring circuit, for multiplying the coring video signal by the weighting signal to generate a sharpened signal;
a delay unit, for receiving and delaying the input video signal to generate a delayed video signal; and
a subtractor, coupled to the second multiplier and the delay unit, for subtracting the sharpened signal from the delayed video signal to generate the sharpened video signal.

18. The image processing circuit of claim 17, wherein the chromatic information of each of the at least two adjacent pixels comprises a first chrominance Cb and a second chrominance Cr.

19. The image processing circuit of claim 18, wherein the processing unit calculates the color difference value of the target pixel according to a first chrominance and a second chrominance of a first pixel and a first chrominance and a second chrominance of a second pixel, the first and the second pixels being adjacent to the target pixel.

20. The image processing circuit of claim 17, wherein the weighting value is a monotonic decreasing function of the color difference value.

21. An image processing method, comprising:
receiving and processing an input video signal comprising information of a plurality of pixels;
determining a color difference value corresponding to a target pixel according to the input video signal, wherein the color difference value is determined according to chromatic information of at least two pixels adjacent to the target pixel;
generating a weighting signal according to the color difference value, wherein the weighting signal comprises a weighting value of the target pixel; and
performing a sharpening operation on the input video signal according to the weighting signal to generate a sharpened video signal, wherein the step of performing the sharpening operation comprises:
multiplying the weighting value of the target pixel by a gain; and
performing the sharpening operation on the input video signal according to the weighting signal and the gain to generate the sharpened video signal.

22. The image processing method of claim 21, wherein the chromatic information comprises a first chrominance Cb and a second chrominance Cr.

23. The image processing method of claim 22, wherein the step of determining the color difference value corresponding to the target pixel comprises:
calculating the color difference value of the target pixel according to a first chrominance and a second chrominance of a first pixel and a first chrominance and a second chrominance of a second pixel, the first and the second pixels being adjacent to the target pixel.

24. The image processing method of claim 23, wherein the color difference value equals $(|Cb(1)-Cb(2)|+|Cr(1)-Cr(2)|)/2$, $Cb(1)$ and $Cr(1)$ are the first chrominance and the second chrominance of the first pixel respectively, and $Cb(2)$ and $Cr(2)$ are the first chrominance and the second chrominance of the second pixel respectively.

25. The image processing method of claim 23, wherein the first chrominance Cb and the second chrominance Cr serve as two reference axes of a chromatic coordinate system, the chromatic coordinate system comprises four regions $\{(Cb, Cr)|Cb \leq Cb_2, Cr \leq Cr_2\}$, $\{(Cb, Cr)|Cb \geq Cb_1, Cr \leq Cr_2\}$, $\{(Cb, Cr)| \leq Cb_2, Cr \geq Cr_1\}$, and $\{(Cb, Cr)|Cb \geq Cb_1, Cr \geq Cr_1\}$, where $Cb_2 > Cb_1 > 0$, $Cr_2 > Cr_1 > 0$, the first and the second chrominances of the first pixel are $Cb(1)$ and $Cr(1)$, the first and the second chrominances of the second pixel are $Cb(2)$ and $Cr(2)$, and the color difference value is determined according to the region(s) where coordinates $(Cb(1),Cr(1))$ and $(Cb(2),Cr(2))$ are located.

26. The image processing method of claim 25, wherein when the coordinates $(Cb(1),Cr(1))$ and $(Cb(2),Cr(2))$ are located in a same region of the four regions, the color difference value equals 0.

27. The image processing method of claim 25, wherein when the coordinates $(Cb(1),Cr(1))$ and $(Cb(2),Cr(2))$ are located in two different regions of the four regions, the color difference value equals $\sqrt{(Cb(1)-Cb(2))^2+(Cr(1)-Cr(2))^2}$.

28. The image processing method of claim 25, wherein when the coordinates $(Cb(1),Cr(1))$ and $(Cb(2),Cr(2))$ are located in two different regions of the four regions, the color difference value equals $(|Cb(1)-Cb(2)|+|Cr(1)-Cr(2)|)$.

29. The image processing method of claim 23, wherein the target pixel is located at the middle point of the first and the second pixels.

30. The image processing method of claim 21, wherein the weighting value is a monotonic decreasing function of the color difference value.

31. The image processing method of claim 30, wherein the step of generating the weighting signal comprises:
interpolating the weighting value of the target pixel according to at least two predetermined color difference values and corresponding weighting values.

32. The image processing method of claim 21, wherein the step of generating the weighting signal comprises:
looking up the weighting value of the target pixel from a lookup table according to the color difference value.

33. An image processing method, comprising:
receiving and processing an input video signal comprising information of a plurality of pixels;
determining a color difference value corresponding to a target pixel according to the input video signal, wherein the color difference value is determined according to chromatic information of at least two pixels adjacent to the target pixel;
generating a weighting signal according to the color difference value, wherein the weighting signal comprises a weighting value of the target pixel; and
performing a sharpening operation on the input video signal according to the weighting signal to generate a sharpened video signal, wherein the step of performing the sharpening operation comprises:
high-pass filtering the input video signal to generate a high frequency video signal;
eliminating a core portion of the high frequency video signal to generate a coring video signal;
multiplying the coring video signal by the weighting signal to generate a sharpened signal;
delaying the input video signal to generate a delayed video signal; and
adding up the sharpened signal and the delayed video signal to generate the sharpened video signal.

34. The image processing method of claim 33, wherein the chromatic information comprises a first chrominance Cb and a second chrominance Cr.

35. The image processing method of claim 34, wherein the step of determining the color difference value corresponding to the target pixel comprises:
calculating the color difference value of the target pixel according to a first chrominance and a second chrominance of a first pixel and a first chrominance and a second chrominance of a second pixel, the first and the second pixels being adjacent to the target pixel.

36. The image processing method of claim 33, wherein the weighting value is a monotonic decreasing function of the color difference value.

37. An image processing method, comprising:
receiving and processing an input video signal comprising information of a plurality of pixels;
determining a color difference value corresponding to a target pixel according to the input video signal, wherein the color difference value is determined according to chromatic information of at least two pixels adjacent to the target pixel;
generating a weighting signal according to the color difference value, wherein the weighting signal comprises a weighting value of the target pixel; and
performing a sharpening operation on the input video signal according to the weighting signal to generate a sharpened video signal, wherein the step of performing the sharpening operation comprises:
low-pass filtering the input video signal to generate a low frequency video signal;
eliminating a core portion of the low frequency video signal to generate a coring video signal;
multiplying the coring video signal by the weighting signal to generate a sharpened signal;
delaying the input video signal to generate a delayed video signal; and
subtracting the sharpened signal from the delayed video signal to generate the sharpened video signal.

38. The image processing method of claim 37, wherein the chromatic information comprises a first chrominance Cb and a second chrominance Cr.

39. The image processing method of claim 38, wherein the step of determining the color difference value corresponding to the target pixel comprises:
calculating the color difference value of the target pixel according to a first chrominance and a second chrominance of a first pixel and a first chrominance and a second chrominance of a second pixel, the first and the second pixels being adjacent to the target pixel.

40. The image processing method of claim 37, wherein the weighting value is a monotonic decreasing function of the color difference value.

* * * * *